(12) United States Patent
Nguyen et al.

(10) Patent No.: US 12,322,209 B2
(45) Date of Patent: Jun. 3, 2025

(54) METHOD AND SYSTEM FOR TRAINING A MACHINE LEARNING MODEL FOR ABNORMAL BEHAVIOR RECOGNITION

(71) Applicant: VINBRAIN JOINT STOCK COMPANY, Ha Noi (VN)

(72) Inventors: Ngoc Hoang Nguyen, Ha Noi (VN); Xuan Thoai Bui, Ha Noi (VN); Xuan Nhat Nguyen, Ha Noi (VN); Quoc Hung Truong, Ha Noi (VN)

(73) Assignee: VINBRAIN JOINT STOCK COMPANY, Ha Noi (VN)

( * ) Notice: Subject to any disclaimer, the term of this patent is extended or adjusted under 35 U.S.C. 154(b) by 467 days.

(21) Appl. No.: 17/965,084

(22) Filed: Oct. 13, 2022

(65) Prior Publication Data

US 2023/0267766 A1     Aug. 24, 2023

(30) Foreign Application Priority Data

Feb. 21, 2022    (VN) .............................. 1-2022-01046

(51) Int. Cl.
*G06V 40/20*      (2022.01)
*G06V 10/764*     (2022.01)
(Continued)

(52) U.S. Cl.
CPC ............ *G06V 40/20* (2022.01); *G06V 10/764* (2022.01); *G06V 10/774* (2022.01);
(Continued)

(58) Field of Classification Search
CPC .. G06V 10/764; G06V 10/774; G06V 10/776; G06V 10/82; G06V 20/52; G06V 40/20
See application file for complete search history.

(56) References Cited

U.S. PATENT DOCUMENTS 11,270,124 B1 * 3/2022 Carvalho ............... G06V 40/28
2022/0222943 A1 * 7/2022 Loeshelle .............. G06V 40/20

OTHER PUBLICATIONS

Lu et al, "Fast human action classification and VOI localization with enhanced sparse coding", 2013. (Year: 2013).*

(Continued)

*Primary Examiner* — Ruiping Li
(74) *Attorney, Agent, or Firm* — Carter, DeLuca & Farrell LLP

(57) ABSTRACT

The present invention relates to a method and system for training a machine learning model for abnormal behavior recognition. The method comprises providing a training dataset that comprises a plurality of labeled training video clips; iteratively training the machine learning model with the training dataset by at least: i) processing a first training video clip in the training dataset using a teacher model to generate a teacher specific human action class; ii) processing the first training video clip using the machine learning model to generate a first embedding vector and a machine learning model specific human action class based on the first embedding vector; iii) processing a second training video clip in the training dataset using the machine learning model to generate a second embedding vector; iv) minimizing a distillation loss that measures distance between the teacher specific human action class and the machine learning model specific human action class; v) minimizing a machine learning loss that measures distance between the machine learning model specific human action class and a ground-truth human action class of the first training video clip; vi) minimizing distance between the first embedding vector and the second embedding vector if the first training video clip and the second training video clip are of the same human action class; and vii) maximizing distance between the first embedding vector and the second embedding vector if the (Continued)

first training video clip and the second training video clip are of difference human action classes.

9 Claims, 2 Drawing Sheets

(51) Int. Cl.
*G06V 10/774* (2022.01)
*G06V 10/776* (2022.01)
*G06V 10/82* (2022.01)
*G06V 20/52* (2022.01)

(52) U.S. Cl.
CPC ............ *G06V 10/776* (2022.01); *G06V 10/82* (2022.01); *G06V 20/52* (2022.01)

(56) References Cited

OTHER PUBLICATIONS

Guo, et al, "Toward Anomaly Behavior Detection as an Edge Network Service Using a Dual-Task Interactive Guided Neural Network", 2021 (Year: 2021).*

* cited by examiner

METHOD AND SYSTEM FOR TRAINING A MACHINE LEARNING MODEL FOR ABNORMAL BEHAVIOR RECOGNITION

FIELD OF THE INVENTION

The present invention generally relates to a method and system for training a machine learning model for abnormal behavior recognition.

DISCUSSION OF RELATED ART

Recently, the number of CCTV cameras increasing markedly, the demand for security monitoring for human behavior has also been significantly enhanced. However, manually monitoring by direct people observation is ineffective. With the strong development of computer science, developing systems that can automatically recognize abnormal/violent with the surveillance video signal has become an attractive research domain. In the relevant literature, there are different methods for video action using traditional machine learning or deep learning. However, there are a lot of challenges when scaling and deploying current methods to real-life systems related to recognition accuracy and costly deployment. Currently, most state-of-art deep learning base video classification models are not appropriate for a real-time surveillance system with multiple cameras due to high computation complexity. Moreover, the lack of data for training deep models is another limitation for violent human behavior recognition.

In particular, in previous approaches, human behavior recognition models have been developed based on handcrafted features such as the pyramid of the histogram of oriented gradients (PHOG) [1], motion descriptors [2], MoSIFT feature [3], and local histogram of oriented gradient [4] or optical flow [5]. Support vector machine (SVM) is one of the most popular machine learning methods to classify behavior classes based on extracted features. Traditional machine learning is a good way to deal with problems with a small dataset, but they remain limited due to environmental changes, noisy backgrounds.

In recent years, deep learning has great success in many computer vision domains. In the human behavior recognition topic, deep learning-based approaches are also rapidly developed. The early approach presents a two-stream network using a combination of spatial features and optical flow [6]. Donahue et al. [7] proposes a method for action video using convolutional neural network CNNs to extract spatial features and a Long-term recurrent neural network RNN model to capture temporal information. In another approach, Tran et al. [8] presents a 3D Convolutional Neural Networks (3D CNNs) to learn spatio-temporal features effectively. There are various model architectures based on 3D CNNs are applied for video analysis tasks such as I3D [9], 3D_ResNet [10] to improve classification accuracy. Channel-Separated Convolutional Network (CSN) [1] is designed based on separated 3D depth-wise convolution, which is faster than typical 3D convolution. The 3D CNNs based-models can obtain good results but its computation is quite comprehensive. Some approaches utilize 2D CNN and sparse temporal sampling strategy for efficient inference such as TSN [12], TSM [13], and TEA [14]; but the prediction accuracy is sensitive with the complex, long-term action. Feichtenhofer et al. [15] presents an X3D network that expands 2D architecture to play in the 3D space-time domain. The X3D network is an efficient network for only small and short input sizes; however, video from CCTV is usually the large size and long-time range. Almost exited video classification approaches are quite hard and costly to deploy and scale for in surveillance monitor system.

CITATION LIST

Non-Patent Literature

1. Amraee, S.; Vafaei, A.; Jamshidi, K.; Adibi, P. Abnormal event detection in crowded scenes using one-class SVM. Signal Image Video Process. 2018, 12, 1115-1123. The citation is herein referred to as [1].
2. Chen, D.; Wactlar, H.; Chen, M. y.; Gao, C.; Bharucha, A.; Hauptmann, A. Recognition of aggressive human behavior using binary local motion descriptors. In Proceedings of the 2008 30th Annual International Conference of the IEEE Engineering in Medicine and Biology Society, Vancouver, BC, Canada, 20-25 Aug. 2008; pp. 5238-5241. The citation is herein referred to as [2].
3. Xu, L.; Gong, C.; Yang, J.; Wu, Q.; Yao, L. Violent video detection based on MoSIFT feature and sparse coding. In Proceedings of the 2014 IEEE International Conference on Acoustics, Speech and Signal Processing (ICASSP), Florence, Italy, 4-9 May 2014; pp. 3538-3542. The citation is herein referred to as [3].
4. Das, S.; Sarker, A.; Mahmud, T. Violence Detection from Videos using HOG Features. In Proceedings of the 2019 4th International Conference on Electrical Information and Communication Technology (EICT), Khulna, Bangladesh, 20-22 Dec. 2019; pp. 1-5. The citation is herein referred to as [4].
5. Zhou, P.; Ding, Q.; Luo, H.; Hou, X. Violence detection in surveillance video using low-level features. PLoS ONE 2018, 13, e0203668. The citation is herein referred to as [5].
6. Simonyan, K.; Zisserman, A. Two-stream convolutional networks for action recognition in videos. arXiv 2014, arXiv:1406.2199. The citation is herein referred to as [6].
7. J. Donahue; L. A. Hendricks; S. Guadarrama; M. Rohrbach; S. Venugopalan; K. Saenko; T. Darrell; "Long-term recurrent convolutional networks for visual recognition and description," Conference on Computer Vision and Pattern Recognition (CVPR), 2015. The citation is herein referred to as [7].
8. D. Tran; L. Bourdev; R. Fergus; L. Torresani; M. Paluri; "Learning spatiotemporal features with 3D convolutional networks," Proc. of IEEE Int. Conf. Comput. Vis. (ICCV), pp. 4489-4497, 2015. The citation is herein referred to as [8].
9. J. Carreira; A. Zisserman; "Quo Vadis, Action Recognition? A New Model and the Kinetics Datase," Conference on Computer Vision and Pattern Recognition (CVPR), 2017. The citation is herein referred to as [9].
10. K. Hara; H. Kataoka; Y. Satoh; "Can Spatiotemporal 3D CNNs Retrace the History of 2D CNNs and ImageNet?," Conference on Computer Vision and Pattern Recognition (CVPR), 2018. The citation is herein referred to as [10].
11. Video Classification with Channel-Separated Convolutional Networks. The citation is herein referred to as [11].
12. Temporal Segment Networks: Towards Good Practices for Deep Action Recognition. The citation is herein referred to as [12].
13. TSM: Temporal Shift Module for Efficient Video Understanding. The citation is herein referred to as [13].
14. TEA: Temporal Excitation and Aggregation for Action Recognition. The citation is herein referred to as [14].

15. X3D: Expanding Architectures for Efficient Video Recognition. The citation is herein referred to as [15].

SUMMARY OF THE INVENTION

The invention has been made to solve the above-mentioned problems. An object of the invention is to provide a method and system for training a machine learning model for abnormal behavior recognition. After being trained, the machine learning model is capable of recognizing violent behavior (i.e., abnormal behavior) such as fighting, sexual harassment, fence climbing in real-time on multi-cameras with an edge device.

Problems to be solved in the embodiments are not limited thereto and include the following technical solutions and also objectives or effects understandable from the embodiments.

According to a first aspect of the invention, there is provided a method for training a machine learning model for abnormal behavior recognition, the method comprising:

providing a training dataset that comprises a plurality of training video clips, wherein each training video clip in the plurality of training video clips comprises a sequence of frames and is labeled with a human action class;

iteratively training the machine learning model with the training dataset by at least:
  processing a first training video clip in the training dataset using a teacher model according to teacher parameters of the teacher model to generate a teacher specific human action class, wherein the teacher model has been trained on the training dataset such that the teacher model is able to detect a human action class from a video clip;
  processing the first training video clip using the machine learning model according to machine learning parameters of the machine learning model to generate a first embedding vector and a machine learning model specific human action class based on the first embedding vector; wherein the number of the machine learning parameters is smaller than the number of the teacher parameters;
  processing a second training video clip in the training dataset using the machine learning model according to the machine learning parameters of the machine learning model to generate a second embedding vector;
  minimizing a distillation loss that measures distance between the teacher specific human action class and the machine learning model specific human action class;
  minimizing a machine learning loss that measures distance between the machine learning model specific human action class and a ground-truth human action class of the first training video clip;
  minimizing distance between the first embedding vector and the second embedding vector if the first training video clip and the second training video clip are of the same human action class; and
  maximizing distance between the first embedding vector and the second embedding vector if the first training video clip and the second training video clip are of difference human action classes.

According to a second aspect of the invention, there is provided a system for training a machine learning model for abnormal behavior recognition, the system comprises one or more computers and one or more storage devices storing instructions that, when executed by the one or more computers, cause the one or more computers to perform the method according to the first aspect of the invention.

BRIEF DESCRIPTION OF THE DRAWINGS

The above and other objects, features, and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
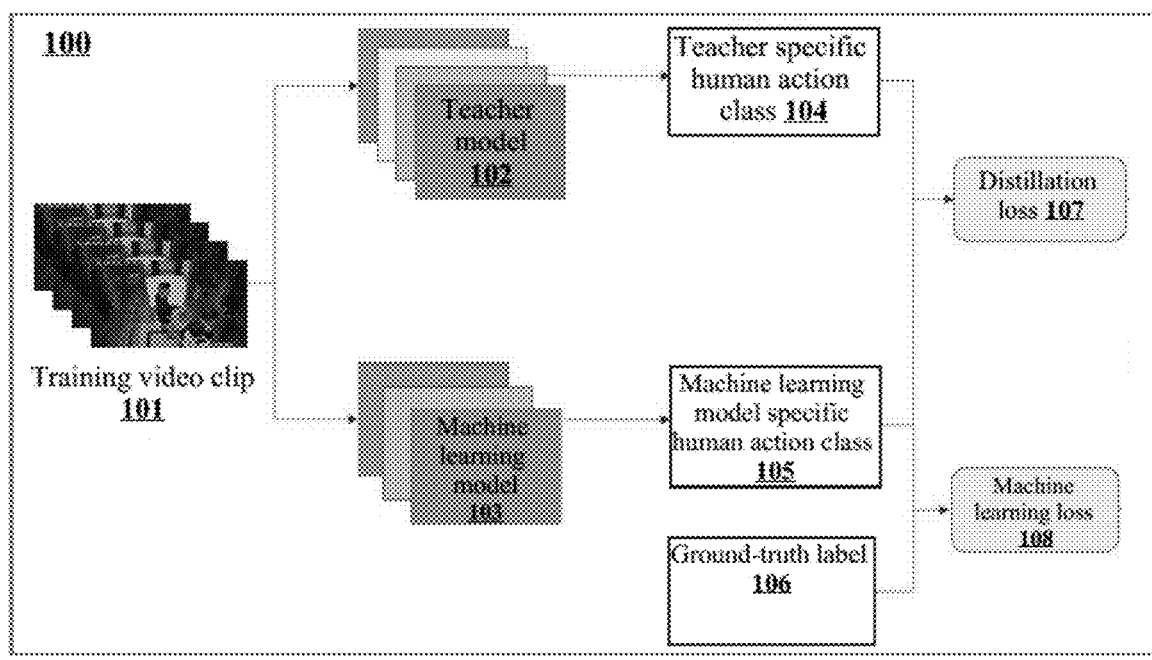
FIG. 1 is a block diagram showing an example system for training a machine learning model for abnormal behavior recognition.

While the invention may have various modifications and alternative forms, specific embodiments thereof are shown by way of example in the drawings and will be described herein in detail. However, there is no intent to limit the invention to the particular forms disclosed. On the contrary, the invention is to cover all modifications, equivalents, and alternatives falling within the spirit and scope of the appended claims.

It should be understood that, although the terms "first," "second," and the like may be used herein to describe various elements, the elements are not limited by the terms. The terms are only used to distinguish one element from another element. For example, a first element could be termed a second element, and, similarly, a second element could be termed a first element without departing from the scope of the invention. As used herein, the term "and/or" includes any and all combinations of one or more of the associated listed items.

The terminology used herein is for the purpose of describing particular embodiments only and is not intended to be limiting to the invention. As used herein, the singular forms "a," "an," "another," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings, the same or corresponding components are denoted by the same reference numerals regardless of reference numbers, and thus the description thereof will not be repeated.

And throughout the detailed description and claims of the present disclosure, the term "training/trained" or "learning/learned" refers to performing machine learning through computing in accordance with a procedure. It will be appreciated by those skilled in the art that it is not intended to refer to a mental function such as human educational activity.

As used herein, a model is trained to output a predetermined output with respect to a predetermined input, and may include, for example, neural networks. A neural network refers to a recognition model that simulates a computation capability of a biological system using a large number of artificial neurons being connected to each other through edges.

The neural network uses artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

Hereinafter, training a neural network refers to training parameters of the neural network. Further, a trained neural network refers to a neural network to which the trained parameters are applied.

Basically, the neural network may be trained through supervised learning or unsupervised learning. Supervised learning refers to a method of providing input data and label corresponding thereto to the neural network, while in unsupervised learning, the input data provided to the neural network does not contain label.

FIG. 1 is the block diagram showing an example system for training a machine learning model for abnormal behavior recognition (hereinafter, the system 100). The system 100 is an example of a system implemented as computer programs on one or more computers in one or more locations in which the systems, components, and techniques described below are implemented.

To train the machine learning model 103, a training dataset is provided. The training dataset comprises a plurality of training video clips. Each training video clip in the plurality of training video clips is labeled with a human action class. The human action class is selected from a non-violent class and three violent classes which are a fighting action class, a fence climbing action class, and a sexual harassment action class.

The machine learning model 103 is iteratively trained with the training dataset applying a knowledge distillation technique and a contrast learning technique.

In particular, the system 100 processes a first training video clip in the training dataset. In FIG. 1, the first training video clip is denoted as the training video clip 101. That is, the system 100 processes the first training video clip using a teacher model 102 according to teacher parameters of the teacher model 102 to generate a teacher specific human action class 104. According to a preferred embodiment, the teacher model 102 is a big network that is based on the CSN (Channel-Separated Convolutional Network)—Resnet152 network for action/behavior video recognition. The CSN-Resnet152 network is a 3D CNN network based on a Resnet152 backbone architecture and 3D depth-wise convolution. The teacher model 102 has been trained with the training database such that the teacher model 102 is able to detect a human action class selected from a non-violent class, a fighting action class, a fence climbing action class, and a sexual harassment action class, from a video clip.

The system 100 processes the first training video clip using the machine learning model 103 according to machine learning parameters of the machine learning model 103 to generate a first embedding vector (not shown) and a machine learning model specific human action class 105 based on the first embedding vector. According to the preferred embodiment, the machine learning model 103 is a lightweight model that is based on a shuffle-3D CNN network and the number of the machine learning parameters is smaller than the number of the teacher parameters.

The system 100 processes a second training video clip in the training dataset using the machine learning model 103 according the machine learning parameters of the machine learning model 103 to generate a second embedding vector (not shown).

The machine learning model 103 is trained by optimizing the following losses/distances.

i) The system 100 minimizes a distillation loss 107 that measures distance between the teacher specific human action class 104 and the machine learning model specific human action class 105. According to the preferred embodiment, the distillation loss is a Kullback-Leibler divergence loss.

ii) The system 100 minimizes a machine learning loss 108 that measures distance between the machine learning model specific human action class 105 and a ground-truth human action class 106 of the first training video clip. According to the preferred embodiment, the machine learning loss is a binary cross-entropy loss.

iii) The system 100 minimizes a distance between the first embedding vector and the second embedding vector if the first training video clip and the second training video clip are of the same human action class.

iv) The system 100 maximizes a distance between the first embedding vector and the second embedding vector if the first training video clip and the second training video clip are of difference human action classes.

Once being trained, the machine learning model 103 is able to perform the action/behavior video recognition task in real time. In particular, the trained machine learning model 103 receives a video clip from a camera of a security system. According to the preferred embodiment, the security system is a part of a smart city. Next, the trained machine learning model 103 processes the video clip to generate an output human action class. Then, the trained machine learning model 103 determines the video clip to comprise an abnormal behavior if the output human action class is included in predetermined action classes. The predetermined action classes are selected from a fighting action class, a fence climbing action class, a sexual harassment action class.

According to the preferred embodiment, the trained machine learning model is quantized from float32 to int8 to optimize memory footprint in deployment stage.

Figure 2:
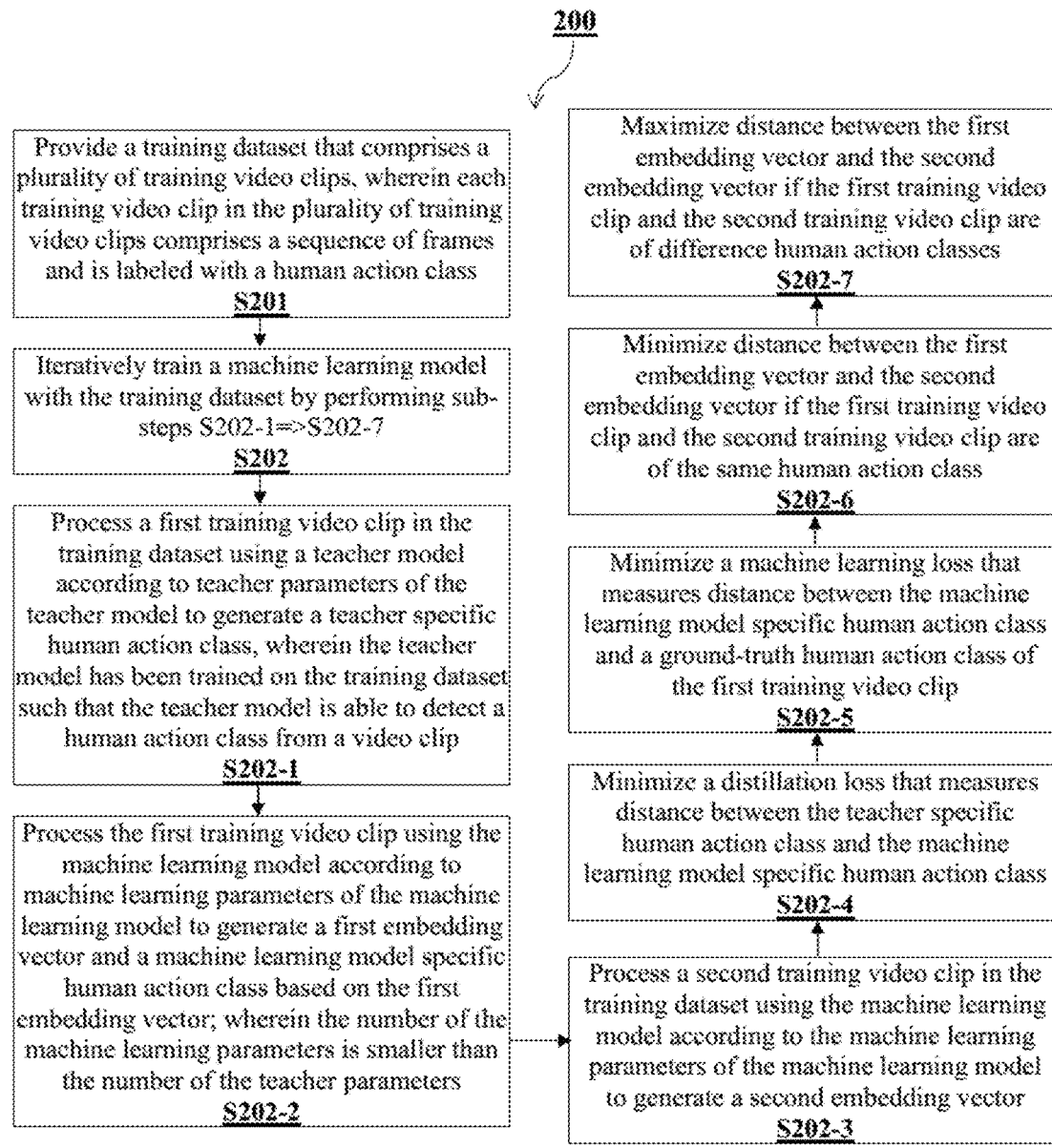
FIG. 2 is a flow diagram of an example process for training a machine learning model for abnormal behavior recognition using the example system of FIG. 1.

FIG. 2 is a flow diagram of an example process 200 for training a machine learning model for abnormal behavior recognition. For convenience, the process 200 will be described as being performed by a system of one or more computers located in one or more locations. For example, a system for training a machine learning model for abnormal behavior recognition, e.g., the system 100 for training a machine learning model for abnormal behavior recognition (hereinafter referred to as "the system") of FIG. 1, appropriately programmed, can perform the process 200.

In step S201, the system provides a training dataset that comprises a plurality of training video clips. Each training video clip in the plurality of training video clips comprises a sequence of frames and is labeled with a human action class. The human action class is selected from a non-violent class and three violent classes which are a fighting action class, a fence climbing action class, and a sexual harassment action class.

In step S202, the system iteratively trains the machine learning model (for example, the machine learning model 103 of FIG. 1) with the training dataset by performing sub-steps S202-1 to S202-7.

In sub-step S202-1, the system processes a first training video clip (for example, the training video clip 101 of FIG. 1) in the training dataset using a teacher model (for example, the teacher model 102 of FIG. 1) according to teacher parameters of the teacher model to generate a teacher specific human action class (for example, the teacher specific human action class 104 of FIG. 1), wherein the teacher model has been trained on the training dataset such that the teacher model is able to detect a human action class selected from a non-violent class, a fighting action class, a fence climbing action class, and a sexual harassment action class from a video clip.

In sub-step S202-2, the system processes the first training video clip using the machine learning model according to machine learning parameters of the machine learning model to generate a first embedding vector and a machine learning model specific human action class (for example, the machine learning model specific human action class 105 of FIG. 1) based on the first embedding vector; wherein the number of the machine learning parameters is smaller than the number of the teacher parameters. Preferably, the teacher model and the machine learning model are video classification networks which are Convolutional Neural Networks.

In sub-step S202-3, the system processes a second training video clip in the training dataset using the machine learning model according to the machine learning parameters of the machine learning model to generate a second embedding vector.

In sub-step S202-4, the system minimizes a distillation loss (for example, the distillation loss 107 of FIG. 1) that measures distance between the teacher specific human action class and the machine learning model specific human action class. According to a preferred embodiment, the distillation loss is a Kullback-Leibler divergence loss.

In sub-step S202-5, the system minimizes a machine learning loss (for example, the machine learning loss 108 of FIG. 1) that measures distance between the machine learning model specific human action class and a ground-truth human action class of the first training video clip.

In sub-step S202-6, the system minimizes distance between the first embedding vector and the second embedding vector if the first training video clip and the second training video clip are of the same human action class.

In sub-step S202-7, the system maximizes distance between the first embedding vector and the second embedding vector if the first training video clip and the second training video clip are of difference human action classes.

The process 200 further comprises following steps i)=>iii).

i) The system receives a video clip from a camera of a security system.

ii) The system processes the video clip using the trained machine learning model to generate an output human action class.

iii) The system determines the video clip to comprise an abnormal behavior if the output human action class is included in predetermined action classes.

According to the preferred embodiment, the predetermined action classes are selected from a fighting action class, a fence climbing action class, a sexual harassment action class.

Furthermore, the trained machine learning model is quantized from float32 to int8 to optimize memory footprint in deployment stage.

Experiments

To train the machine learning model for abnormal human behavior detection on a CTTV camera, the experiments build a large dataset of three violent classes of the fighting, climbing fence, sexual harassment, and a non-violent class. Videos in the dataset are collected directly from CTTV of the different view of smart city and are crawled from different social networks. The dataset contain total 24,000 videos includes 2,400 fighting video, 1,000 sexual harassment videos, 800 fence climbing, and 16,000 normal videos.

Firstly, the experiments train a big model based on the CSN_Resnet152 model as a teacher model. After that, a lightweight student model (i.e., the machine learning model of the invention) based on the Shuffle_3D CNN model is optimized by transferring knowledge from the teacher model and contrastive objects. In the knowledge distillation, the student is supervised by both ground-truth labels and the teacher's logits prediction. Otherwise, contrastive learning pushes the model to learn a better representation of data space of different classes, the mutual information between student and teacher features can be maximized transfer.

According to the experiment settings, the teacher model (i.e, the CSN_Resnet152 model) is a good accuracy model on action/behavior video recognition but its parameters is 32 millions, which is too computational complexity to deploy into an edge device. The lightweight student model has only 4.7 millions parameters which are significantly lower than the number of parameters of the teacher model. The lightweight student model can perform real-time on multi-cameras with an edge device. For example, the edge device is Jetson Xavier NX Nvidia.

The effectiveness of the lightweight student model is evaluated on both the collection test set and the RWF-2000 dataset. The model of the invention outperforms fighting recognition with 90% accuracy on RWF-2000 data. In the collected dataset, the model also achieved impressive results for three classes fighting, fence climbing, sexual harassment is 95%, 99%, and 89% accuracy, respectively.

For a system of one or more computers to be configured to perform particular operations or actions means that the system has installed on it software, firmware, hardware, or a combination of them that in operation cause the system to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training a machine learning model for abnormal behavior recognition, comprising:
    providing a training dataset that comprises a plurality of training video clips, wherein each training video clip in the plurality of training video clips comprises a sequence of frames and is labeled with a human action class;
    iteratively training the machine learning model with the training dataset by at least:
        processing a first training video clip in the training dataset using a teacher model according to teacher parameters of the teacher model to generate a teacher specific human action class, wherein the teacher model has been trained on the training dataset such that the teacher model is able to detect a human action class from a video clip;
        processing the first training video clip using the machine learning model according to machine learning parameters of the machine learning model to generate a first embedding vector and a machine learning model specific human action class based on the first embedding vector; wherein the number of the machine learning parameters is smaller than the number of the teacher parameters;
        processing a second training video clip in the training dataset using the machine learning model according to the machine learning parameters of the machine learning model to generate a second embedding vector;
        minimizing a distillation loss that measures distance between the teacher specific human action class and the machine learning model specific human action class;
        minimizing a machine learning loss that measures distance between the machine learning model specific human action class and a ground-truth human action class of the first training video clip;
        minimizing distance between the first embedding vector and the second embedding vector if the first training video clip and the second training video clip are of the same human action class; and
        maximizing distance between the first embedding vector and the second embedding vector if the first training video clip and the second training video clip are of difference human action classes.

2. The method of claim 1, wherein the human action class is selected from a non-violent class and three violent classes which are a fighting action class, a fence climbing action class, and a sexual harassment action class.

3. The method of claim 2, further comprising:
    receiving a video clip from a camera of a security system;
    processing the video clip using the trained machine learning model to generate an output human action class; and
    determining the video clip to comprise an abnormal behavior if the output human action class is included in predetermined action classes.

4. The method of claim 3, wherein the predetermined action classes are selected from a fighting action class, a fence climbing action class, a sexual harassment action class.

5. The method of claim 4, wherein the distillation loss is a Kullback-Leibler divergence loss.

6. The method of claim 5, wherein the machine learning loss is a binary cross-entropy loss.

7. The method of claim 6, wherein the trained machine learning model is quantized from float32 to int8 to optimize memory footprint in deployment stage.

8. The method of claim 7, wherein the teacher model and the machine learning model are video classification networks which are Convolutional Neural Networks.

9. A system for training a machine learning model for abnormal behavior recognition, the system comprising one or more computers and one or more storage devices storing instructions that, when executed by the one or more computers, cause the one or more computers to perform operations comprising:
    providing a training dataset that comprises a plurality of training video clips, wherein each training video clip in the plurality of training video clips comprises a sequence of frames and is labeled with a human action class;
    iteratively training the machine learning model with the training dataset by at least:
        processing a first training video clip in the training dataset using a teacher model according to teacher parameters of the teacher model to generate a teacher specific human action class, wherein the teacher model has been trained on the training dataset such that the teacher model is able to detect a human action class from a video clip;
        processing the first training video clip using the machine learning model according to machine learning parameters of the machine learning model to generate a first embedding vector and a machine learning model specific human action class based on the first embedding vector; wherein the number of the machine learning parameters is smaller than the number of the teacher parameters;

processing a second training video clip in the training dataset using the machine learning model according to the machine learning parameters of the machine learning model to generate a second embedding vector;

minimizing a distillation loss that measures distance between the teacher specific human action class and the machine learning model specific human action class;

minimizing a machine learning loss that measures distance between the machine learning model specific human action class and a ground-truth human action class of the first training video clip;

minimizing distance between the first embedding vector and the second embedding vector if the first training video clip and the second training video clip are of the same human action class; and maximizing distance between the first embedding vector and the second embedding vector if the first training video clip and the second training video clip are of difference human action classes.

* * * * *